US012250673B2

(12) United States Patent
Takeda et al.

(10) Patent No.: US 12,250,673 B2

(45) Date of Patent: Mar. 11, 2025

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 577 days.

(21) Appl. No.: 17/276,631

(22) PCT Filed: Sep. 21, 2018

(86) PCT No.: PCT/JP2018/035221

§ 371 (c)(1),
(2) Date: Mar. 16, 2021

(87) PCT Pub. No.: WO2020/059148

PCT Pub. Date: Mar. 26, 2020

(65) Prior Publication Data

US 2022/0046665 A1 Feb. 10, 2022

(51) Int. Cl.

*H04L 5/00* (2006.01)
*H04L 1/00* (2006.01)

(Continued)

(52) U.S. Cl.

CPC ....... *H04W 72/1268* (2013.01); *H04L 1/0003* (2013.01); *H04L 1/0061* (2013.01); *H04W 72/0466* (2013.01); *H04W 72/23* (2023.01)

(58) Field of Classification Search

None

See application file for complete search history.

(56) References Cited

U.S. PATENT DOCUMENTS 11,201,763 B2 12/2021 Urabayashi
2011/0176554 A1 7/2011 Yamada et al.

(Continued)

FOREIGN PATENT DOCUMENTS

EP 2737767 A1 6/2014
EP 3076735 A1 10/2016

(Continued)

OTHER PUBLICATIONS

Extended European Search Report issued in European Application No. 18934162.1, dated Apr. 4, 2022 (9 pages).

(Continued)

*Primary Examiner* — Sithu Ko

(74) *Attorney, Agent, or Firm* — Osha Bergman Watanabe & Burton LLP

(57) ABSTRACT

In order to appropriately control reception of downlink control information, a user terminal according to one aspect of the present disclosure includes: a receiving section that receives first downlink control information and second downlink control information to which at least one of different Radio Network Temporary Identifiers (RNTIs), different modulations and coding tables, and different transmission parameters are applied; and a control section that stores the first downlink control information and the second downlink control information thus received so that the number of pieces of the first downlink control information and the second downlink control information to store do not exceed a given number.

13 Claims, 12 Drawing Sheets

(51) Int. Cl.
*H04W 72/044* (2023.01)
*H04W 72/1268* (2023.01)
*H04W 72/23* (2023.01)

(56) References Cited

U.S. PATENT DOCUMENTS

2015/0124729 A1* 5/2015 Lee ........................ H04L 5/0053 370/329
2017/0041904 A1 2/2017 Suzuki et al.
2019/0223164 A1* 7/2019 He ...................... H04L 25/0204
2019/0349964 A1* 11/2019 Liou ..................... H04W 76/27
2020/0374094 A1* 11/2020 Pelletier ................ H04L 5/0094
2021/0259044 A1* 8/2021 Islam ................ H04W 52/0229
2022/0132426 A1* 4/2022 Zhou ................. H04W 52/0235
2022/0304002 A1* 9/2022 Wang .................... H04W 24/08
2023/0007524 A1* 1/2023 Wang .................... H04L 5/0091
2023/0180237 A1* 6/2023 Yoshimura ........ H04W 72/1268 370/329

FOREIGN PATENT DOCUMENTS

JP 2011151601 A 8/2011
WO 2013017178 A1 2/2013
WO 2017/195895 A1 11/2017

OTHER PUBLICATIONS

Office Action issued in counterpart Indian Patent Application No. 202117018100 mailed on Nov. 14, 2022 (6 pages).

International Search Report issued in PCT/JP2018/035221, mailed on Dec. 4, 2018 (3 pages).

Written Opinion of the International Searching Authority issued in PCT/JP2018/035221, mailed on Dec. 4, 2018 (4 pages).

Huawei, HiSilicon; "Remaining issues on DL control"; 3GPP TSG RAN WG1 Meeting #94, R1-1808069; Gothenburg, Sweden, Aug. 20-24, 2018 (8 pages).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in the counterpart Japanese Patent Application No. 2020-547605, mailed on Aug. 30, 2022 (6 pages).

Office Action issued in the counterpart Japanese Patent Application No. 2020-547605, mailed on May 17, 2022 (6 pages).

Ericsson; "Text Proposal to capture MCS-C-RNTI"; 3GPP TSG RAN WG1 Meeting #94, R1-1809871; Göteborg, Sweden, Aug. 20-24, 2018 (11 pages).

Office Action issued in Chinese Application No. 201880099676.7; Dated Jul. 6, 2023 (17 pages).

Office Action issued in Mexican Application No. MX/a/2021/003254, dated Sep. 5, 2024 (8 pages).

Office Action issued in Australian Application No. 2018441765, dated Aug. 5, 2024 (3 pages).

Office Action issued in counterpart Mexican Application No. MX/a/2021/003254, mailed Mar. 5, 2024 (7 pages).

Office Action issued in corresponding Australian Application No. 2018441765, mailed May 1, 2024 (3 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In the existing LTE system (for example, LTE Rel. 8 to 14), a user terminal (UE (User Equipment)) controls the reception of a downlink shared channel (for example, PDSCH (Physical Downlink Shared Channel)), based on a downlink control information (DCI (Downlink Control Information), also referred to as DL assignment and the like) transmitted through a downlink control channel (for example, PDCCH (Physical Downlink Control Channel)). The user terminal controls the transmission of an uplink shared channel (for example, PUSCH (Physical Uplink Shared Channel)) based on DCI (also referred to as UL grant and the like).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the future radio communication system (hereinafter, referred to as NR), it is studied that a UE stores received DCI, and controls transmission/reception of a physical shared channel which is scheduled by the DCI. For example, it is studied that in a case that a UE receives DCI in a given timing (for example, given slot), the DCI which has been received by the slot is stored.

Because the load of the UE becomes higher as the number of pieces of DCI stored by the UE increases, it is considered to limit the number of pieces of DCI to store. Meanwhile, in NR, DCI is utilized for not only the scheduling of a physical shared channel but also an indication of other applications (for example, activation or deactivation of a given signal and the like). In this way, it is not studied enough how to control the reception operation of DCI (for example, storage of DCI and the like) in a case of utilizing DCI for different applications.

The present disclosure has been made in view of such a point, and the purpose of the present disclosure is to provide a user terminal and a radio communication method which can appropriately control reception of downlink control information.

Solution to Problem

A user terminal according to one aspect of the present disclosure includes: a receiving section that receives first downlink control information and second downlink control information to which at least one of different Radio Network Temporary Identifiers (RNTIs), different modulations and coding tables, and different transmission parameters are applied; and a control section that stores the first downlink control information and the second downlink control information thus received so that the number of pieces of the first downlink control information and the second downlink control information to store do not exceed a given number.

Advantageous Effects of Invention

According to one aspect of the present disclosure, it is possible to appropriately control reception of downlink control information.

DESCRIPTION OF EMBODIMENTS

In NR, it is studied that a UE stores received DCI, and controls transmission/reception of a physical shared channel (for example, PDSCH or PUSCH) which is scheduled by the DCI. For example, in a case that the UE receives DCI in a given slot, the UE stores DCI for scheduling a PDSCH which has not been received or a PUSCH which has not been transmitted among pieces of DCI which have been received by the slot (see FIG. 1). Note that in the present specification, the term "store" may be interchangeably interpreted as "accumulate," "hold," "record," or "save."

Figure 1:
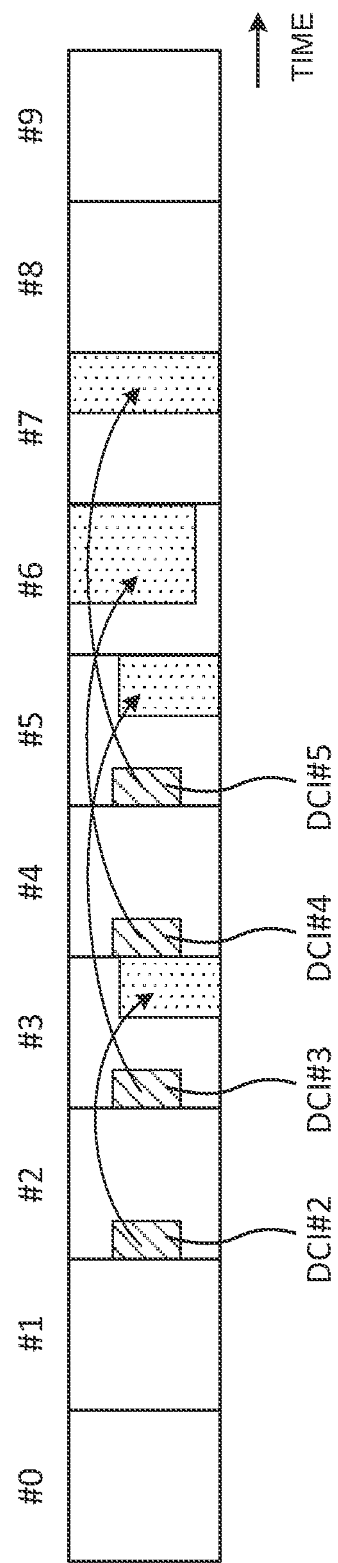
FIG. 1 is a diagram for describing storing of DCI in a UE.

FIG. 1 shows a case in which the UE stores DCI #3 to DCI #5 for which corresponding PDSCHs have not been received among pieces of DCI received before slot #5 at the stage of slot #5. In this way, even in a case that DCI and a PDSCH which is scheduled by the DCI are transmitted in different slots, the UE can appropriately perform the reception of the PDSCH, based on the DCI.

Meanwhile, because the load of the reception processing (for example, baseband or RF processing, memory size for the storage, and the like) of the UE becomes higher as the number of pieces of DCI stored by the UE increases, it is considered to limit the number of pieces of DCI to store. For example, in a case that the number of pieces of DCI to be stored on the UE side is not limited, the load for the UE may increase for preparing for the reception of PDSCHs or the transmission of PUSCHs for pieces of DCI which keep on being stored.

Therefore, it is considered to set the number of pieces of DCI which are stored by the UE, to be equal to or less than a given value. For example, the given value may be 16 or may be other values.

Incidentally, in NR, it is assumed to utilize downlink control information (DCI) for different applications to control the communication. For example, DCI is assumed to be utilized for the following applications. It is needless to say that the applications to which DCI is applied are not limited below.

<DL>

- DCI to utilize for PDSCH of broadcast (broadcast PDSCH)
- DCI to utilize for PDSCH of unicast (unicast PDSCH)
- DCI to utilize for activation of PDSCH of semi-persistent scheduling (SPS PDSCH)
- DCI to utilize for deactivation of PDSCH of semi-persistent scheduling (SPS PDSCH)

<UL>

- DCI to utilize for PUSCH of message 3 (Msg3 PUSCH) in random access procedure
- DCI to utilize for PUSCH of unicast (unicast PUSCH)
- DCI to utilize for activation of PUSCH of configured grant type 2 (PUSCH configured grant Type 2)
- DCI to utilize for deactivation of PUSCH of configured grant type 2 (PUSCH configured grant Type 2)
- DCI to utilize for activation of semi-persistent CSI utilizing PUSCH (SP-CSI on PUSCH)
- DCI to utilize for deactivation of semi-persistent CSI utilizing PUSCH (SP-CSI on PUSCH)

In this way, in a case that DCI is used for different applications, there is a problem in how to control the reception operation of DCI (for example, storing of DCI and the like). In a case that reception operation of DCI is not appropriately performed, degradation of the communication quality may occur.

The inventors of the present invention focused on a point that the UE receives DCI used for different applications, and came up with the idea of controlling reception processing of DCI (for example, limit of the number of pieces of DCI to store and the like) depending on the classification of DCI or regardless of the classification of DCI.

The present embodiment will be described in detail with reference to the drawings as follows. Each aspect described below may be employed independently or may be appropriately employed in combination.

(First Aspect)

In the first aspect, the number of pieces to store in the UE for DCI for a given application is limited among pieces of DCI to utilize for the reception of a signal or a channel of DL. Note that in the following description, the term "the number of pieces to store" may be interchangeably interpreted as "the number of pieces of accumulation," "the number of pieces of retention," "the number of pieces of recording," "the number of pieces of saving," or "the number of pieces of reception."

In the following description, the following DCI classification will be described as DCI to utilize for the reception of a signal or a channel of DL, but the DCI classification applicable in the present embodiment is not limited to this.

- DCI to utilize for PDSCH (for example, to schedule PDSCH) of broadcast
- DCI to utilize for PDSCH (for example, to schedule PDSCH) of unicast
- DCI to utilize for activation of PDSCH of SPS
- DCI to utilize for deactivation (or release of SPS) of PDSCH of SPS (SPS PDSCH)

The PDSCH of broadcast may be a PDSCH scheduled by DCI which is CRC-scrambled by a given RNTI (for example, at least one of SI-RNTI, P-RNTI, RA-RNTI, and TC-RNTI).

The PDSCH of unicast may be a PDSCH scheduled by DCI which is CRC-scrambled by a given RNTI (for example, at least one of C-RNTI and MCS-C-RNTI).

The DCI to be utilized for activation or deactivation of PDSCH of SPS may be DCI which is CRC-scrambled by a given RNTI (for example, CS-RNTI).

The UE performs the reception processing so that the number of pieces to store for DCI for the given application is equal to or less than a given value. For example, the UE is not required to store the number of pieces of DCI more than a given value (for example, $X_1$). In this case, in a given timing of a given serving cell (or at any timing), the UE may perform the reception processing assuming to store DCIs up to a maximum number $X_1$, or assuming that the total of pieces of DCI for the given application to be stored is equal to or less than $X_1$ pieces.

Alternatively, the UE may assume not to receive more than $X_1$ PDCCHs to be utilized for the transmission of at least one of DCI for scheduling a given channel and DCI for indicating the activation/deactivation of the given channel in a given timing. Note that, $X_1$ may be a value configured in advance by the specification, or a value configured by utilizing higher layer signaling or the like from the base station to the UE.

In a case that the UE receives a PDSCH scheduled by DCI, the UE may discard the DCI corresponding to the received PDSCH. In a case that the UE activates a PDSCH for which activation is indicated by DCI, the UE may discard the DCI corresponding to the activated SPS PDSCH. Similarly, in a case that the UE deactivates a PDSCH for which deactivation is indicated by DCI, the UE may discard the DCI corresponding to the deactivated SPS PDSCH.

In a case that the number of pieces of DCI to store is more than $X_1$, the UE may discard given DCI among the pieces of DCI being stored. The DCI to discard may be DCI where the reception timing is the earliest. Alternatively, the UE may configure priority for the applications of DCI and discard DCI where the priority is low in a case that the number of pieces to store is larger than $X_1$. In a case that the UE discards given DCI before performing control based on the DCI, the UE may not perform the reception of a broadcast PDSCH, the reception of a unicast PDSCH, the activation of a SPS PDSCH, or the deactivation of a SPS PDSCH indicated by the discarded DCI.

In a case that the UE discards the DCI, the UE may set the HARQ-ACK bit to NACK, based on the DCI to transmit. Alternatively, in a case that the UE discards DCI for indicating the activation of the SPS PDSCH or the deactivation of the SPS PDSCH, the UE may perform the activation of the SPS PDSCH or the deactivation of the SPS PDSCH at the timing (for example, a slot or a symbol) of the discard.

The DCI of the given application to limit the number of pieces to store in the UE may apply either one of the following structure 1-1 to structure 1-3. In each following structure, in a given slot (for example, the present slot at which the UE is performing the reception) of a given cell, number of pieces of DCI to store which has been received by the given slot will be described.

Note that DCI stored by the UE is assumed to be DCI where operation (for example, reception, activation, or deactivation of PDSCH) associated with the DCI is not performed among the pieces of DCI which have been received, but the present invention is not limited to this. The DCI indicated in the following structure 1-1 to structure 1-3 may be a given DCI format (for example, at least one of DCI format 1_0 and DCI format 1_1).

<Structure 1-1>

As the DCI for the given application, DCI utilized for the scheduling of the PDSCH, DCI utilized for the activation of the PDSCH, and DCI utilized for the deactivation of the PDSCH may be included.

Figure 2:
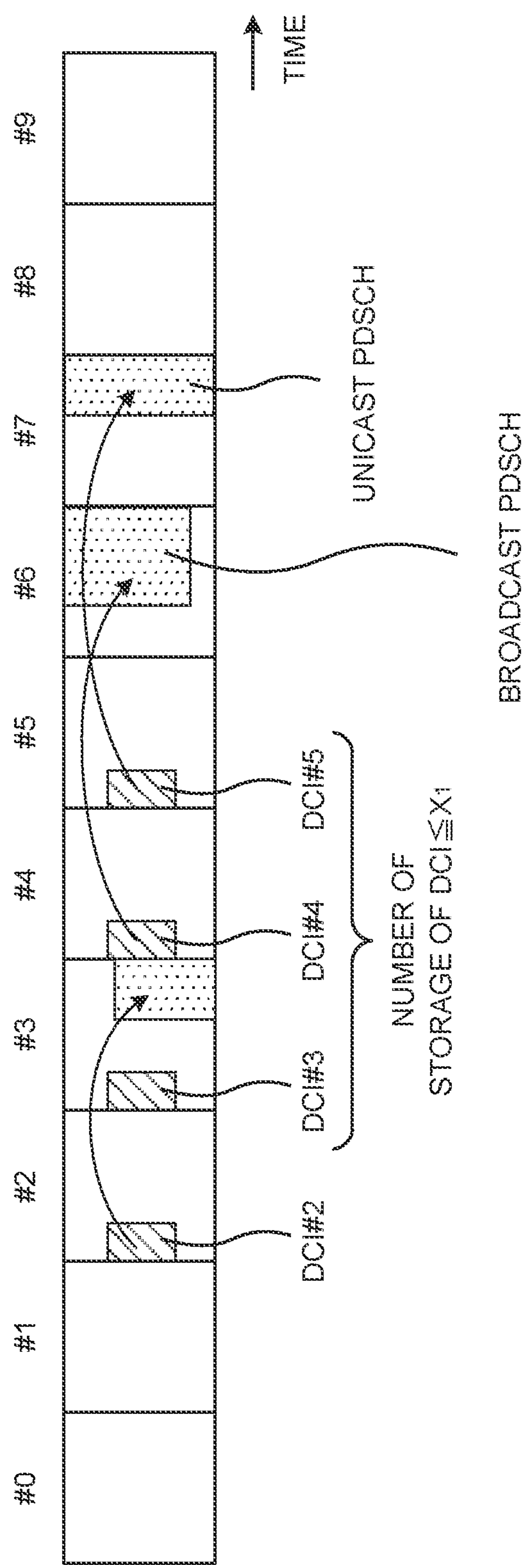
FIG. 2 is a diagram to show an example of storage control of DCI according to the first aspect.

For example, the UE controls the number of pieces to store (the total numbers of pieces of DCI to store for different applications) so as not to exceed a given value (for example, $X_1$) for the DCI utilized for the schedule of the PDSCH of unicast (for example, DCI #5 of FIG. 2), the DCI utilized for the schedule of the PDSCH of broadcast (for example, DCI #4 of FIG. 2), the DCI utilized for the activation of the PDSCH of SPS, and the DCI utilized for the deactivation of the PDSCH of SPS (for example, DCI #3 of FIG. 2).

In this way, it is possible to set the number of pieces of DCI held in the storage to be equal to or less than a given value, and thus it is possible to suppress the load of the UE associated with preparations for the PDSCH reception and the like from increasing.

<Structure 1-2>

As the DCI for the given application, DCI utilized for the scheduling of the PDSCH, and DCI utilized for the activation of the PDSCH may be included. Meanwhile, DCI utilized for the deactivation of the PDSCH may be configured such that the number of pieces to store is not limited (or is not counted as the number of pieces to store).

Figure 3:
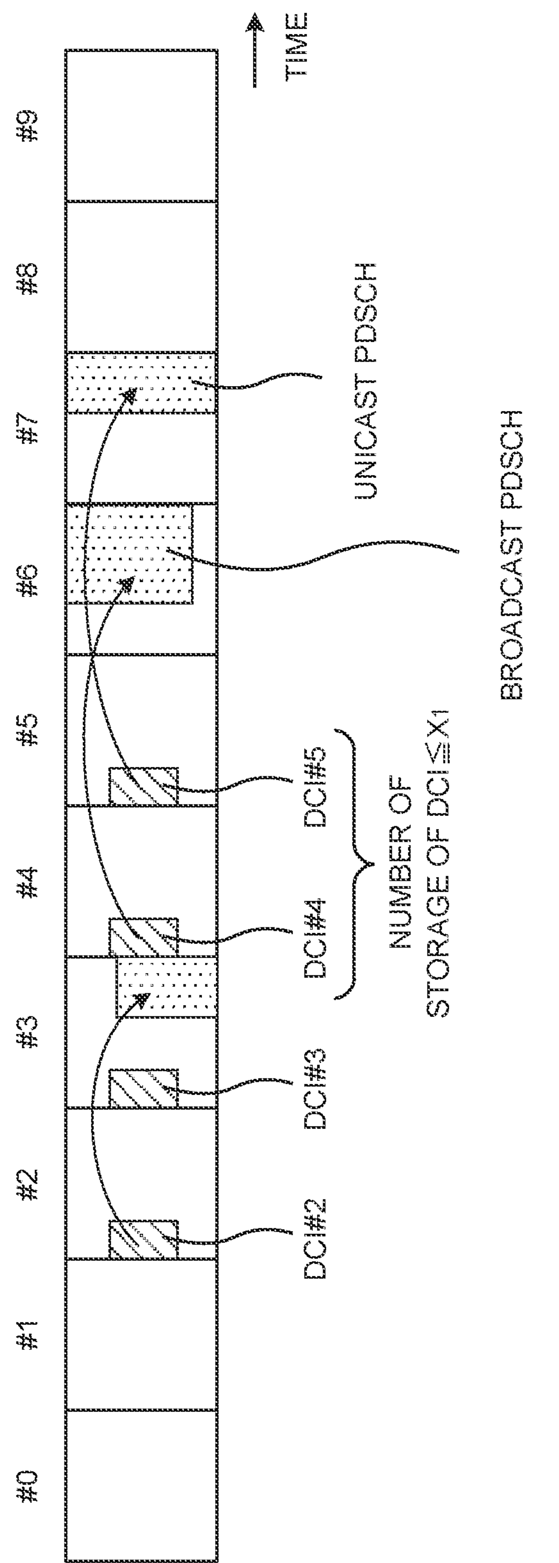
FIG. 3 is a diagram to show another example of storage control of DCI according to the first aspect.

For example, the UE controls the number of pieces to store so as not to exceed a given value (for example, $X_1$) for the DCI utilized for the schedule of the PDSCH of unicast (for example, DCI #5 of FIG. 3), the DCI utilized for the schedule of the PDSCH of broadcast (for example, DCI #4 of FIG. 3), and the DCI utilized for the activation of the PDSCH of SPS.

In a case that the UE receives DCI for indicating the deactivation of the PDSCH of SPS, the UE is not required to perform the reception operation of the PDSCH (for example, preparation for the reception of the PDSCH). Therefore, even with the structure where the DCI utilized for the deactivation of the PDSCH of SPS is not counted as the number of pieces to store, the impact on the UE load can be small. By setting the structure where the DCI utilized for the deactivation of the PDSCH of SPS is not counted as the number of pieces to store, it is possible to secure the number of pieces of other DCI to store.

<Structure 1-3>

The DCI for the given application may be DCI for indicating the scheduling or the activation of the PDSCH for which a transmission confirmation signal (also referred to as HARQ-ACK, A/N, or ACK/NACK) corresponding to the PDSCH is required. For example, as the DCI for a given application, DCI utilized for the scheduling of the PDSCH of unicast, and DCI utilized for the activation or the deactivation of the PDSCH may be included. Meanwhile, DCI utilized for the scheduling of the PDSCH of broadcast may be configured such that the number of pieces to store is not limited (or is not counted as the number of pieces to store).

Figure 4:
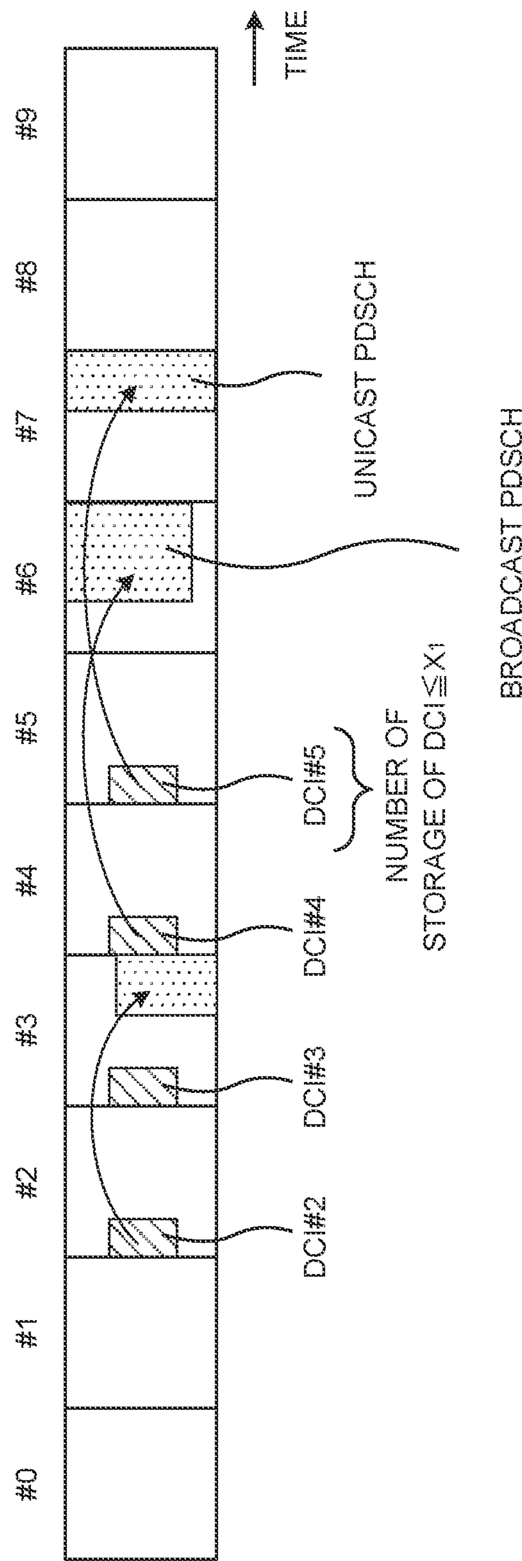
FIG. 4 is a diagram to show another example of storage control of DCI according to the first aspect.

For example, the UE controls the number of pieces to store so as not to exceed a given value (for example, $X_1$) for the DCI utilized for the schedule of the PDSCH of unicast (for example, DCI #5 of FIG. 4), and the DCI utilized for the activation of the PDSCH of SPS and the deactivation of the PDSCH of SPS.

In a case that the UE receives the DCI for scheduling the PDSCH of broadcast, the UE is not required to perform the transmission operation of HARQ-ACK corresponding to the PDSCH (for example, HARQ-ACK operation). Therefore, even with the structure where the DCI for scheduling the PDSCH of broadcast is not counted as the number of pieces to store, the impact on the UE load can be small to some extent.

By setting the structure where at least one of the DCI for scheduling the PDSCH of broadcast and the DCI utilized for the deactivation of the PDSCH of SPS is not counted as the number of pieces to store, it is possible to secure the number of pieces of other DCI to store.

<Variations>

Note that, in the structure 1-1 to structure 1-3 described above, structures where the number of pieces to store is limited for DCI for different applications altogether are described, but the present invention is not limited to this. A structure where an upper limit of the number of pieces to store is limited for each DCI for each different application may be possible. For example, the number of pieces to store for the DCI utilized for the schedule of the PDSCH of unicast and the DCI utilized for the schedule of the PDSCH of broadcast may be set to be equal to or less than $Y_1$, and the number of pieces to store for the DCI utilized for the activation of the PDSCH of SPS and the DCI utilized for the deactivation of the PDSCH of SPS may be set to be equal to or less than $Y_2$. In this way, it is possible to flexibly control number of pieces of DCI to store depending on the applications of the DCI.

(Second Aspect)

In the second aspect, the number of pieces to store in the UE for DCI for a given application is limited among pieces of DCI to utilize for the reception of a signal or a channel of UL.

In the following description, the following DCI classification will be described as DCI to utilize for the reception of a signal or a channel of UL, but the DCI classification applicable in the present embodiment is not limited to this.

- DCI to utilize for PUSCH of message 3 in random access procedure
- DCI to utilize for PUSCH of unicast
- DCI to utilize for activation of PUSCH of configured grant type 2
- DCI to utilize for deactivation of PUSCH of configured grant type 2

DCI to utilize for activation of SP-CSI utilizing PUSCH
DCI to utilize for deactivation of SP-CSI utilizing PUSCH The PUSCH of message 3 may be a PUSCH scheduled by DCI which is CRC-scrambled by a given RNTI (for example, TC-RNTI).

The PUSCH of unicast may be a PUSCH scheduled by DCI which is CRC-scrambled by a given RNTI (for example, at least one of C-RNTI and MCS-C-RNTI).

The DCI to be utilized for activation or deactivation of PUSCH of configured grant type 2 may be DCI which is CRC-scrambled by a given RNTI (for example, CS-RNTI).

The DCI to be utilized for activation or deactivation of SP-CSI utilizing PUSCH may be DCI which is CRC-scrambled by a given RNTI (for example, SP-CSI-RNTI).

The UE performs the reception processing so that the number of pieces to store for DCI for the given application is equal to or less than a given value. For example, the UE is not required to store the number of pieces of DCI more than a given value (for example, $X_2$). In this case, in a given timing of a given serving cell (or at any timing), the UE may perform the reception processing assuming to store DCIs up to a maximum number $X_2$, or assuming that the total of pieces of DCI for the given application to be stored is equal to or less than $X_2$ pieces.

Alternatively, the UE may assume not to receive more than $X_2$ PDCCHs to be utilized for the transmission of at least one of DCI for scheduling a given channel and DCI for indicating the activation/deactivation of the given channel/signal in a given timing. Note that, $X_2$ may be a value configured in advance by the specification, or a value configured by utilizing higher layer signaling or the like from the base station to the UE. $X_2$ may be a value same as $X_1$ indicated in the first aspect, or $X_1$ and $X_2$ may be configured separately.

In a case that the UE transmits a PUSCH scheduled by DCI, the UE may discard the DCI corresponding to the transmitted PUSCH. In a case that the UE activates a PUSCH or SP-CSI for which activation is indicated by DCI, the UE may discard the DCI corresponding to the activated PUSCH or SP-CSI. Similarly, in a case that the UE deactivates a PUSCH or SP-CSI for which deactivation is indicated by DCI, the UE may discard the DCI corresponding to the deactivated PUSCH or SP-CSI.

In a case that the UE discards given DCI before performing control based on the DCI, the UE may not perform the PUSCH transmission of message 3, the PUSCH transmission of unicast, the activation of the PUSCH of configured grant type 2, the deactivation of the PUSCH of configured grant type 2, the activation of the SP-CSI utilizing the PUSCH, or the deactivation of the SP-CSI utilizing the PUSCH in the random access procedure indicated by the DCI to be discarded. For the configuration type 2, in a case that the UE discards the DCI for indicating activation or deactivation, the UE may transmit the PUSCH in which Configured grant confirmation is reported in a given LCID (Logical Channel Identifier) of a MAC PDU sub-header, based on the DCI.

Alternatively, in a case that the UE discards the DCI for indicating the activation or the deactivation of the configuration type 2 or the SP-CSI, the UE may perform the activation or the deactivation of the configuration type 2 or the SP-CSI at the timing (for example, a slot or a symbol) to discard.

In a case that number of pieces of DCI to store is more than $X_2$, the UE may discard given DCI among the pieces of DCI being stored. The DCI to discard may be DCI where the reception timing is the earliest. Alternatively, the UE may configure priority for the applications of DCI and discard DCI where the priority is low in a case that the number of pieces to store is larger than $X_2$.

The DCI of the given application to limit the number of pieces to store in the UE may apply any one of the following structure 2-1 to structure 2-3. Note that, in each following structure, in a given slot (for example, the present slot at which the UE is performing the reception) of a given cell, number of pieces of DCI to store which has been received by the given slot will be described. Note that DCI stored by the UE is assumed to be DCI where operation (for example, transmission, activation, or deactivation of PUSCH) associated with the DCI is not performed among pieces of DCI which have been received, but the present invention is not limited to this.

<Structure 2-1>

As the DCI for the given application, DCI utilized for the scheduling of the PUSCH, DCI utilized for the activation/deactivation of the PUSCH of configured grant type 2, and DCI utilized for the activation/deactivation of the SP-CSI utilizing the PUSCH may be included.

For example, the UE controls the number of pieces to store (the total of the numbers of the storage of DCI for different applications) so as not to exceed a given value (for example, $X_2$) for the DCI utilized for the PUSCH of unicast, the DCI utilized for the PUSCH of message 3, the DCI utilized for the activation of the PUSCH of configured grant type 2, the DCI utilized for the deactivation of the PUSCH of configured grant type 2, the DCI utilized for the activation of the SP-CSI utilizing the PUSCH, and the DCI utilized for the deactivation of the SP-CSI utilizing the PUSCH.

In this way, it is possible to set the number of pieces of DCI held in the storage to be equal to or less than a given value, and thus it is possible to suppress the load of the UE associated with preparations for the PUSCH transmission and the like from increasing.

<Structure 2-2>

As the DCI for the given application, DCI utilized for the scheduling of the PUSCH, DCI utilized for the activation of the PUSCH of configured grant type 2, and DCI utilized for the activation of the SP-CSI utilizing the PUSCH may be included. Meanwhile, at least one of DCI utilized for the deactivation of the PUSCH of configured grant type 2, and DCI utilized for the deactivation of the SP-CSI utilizing the PUSCH may be configured such that the number of pieces to store is not limited (or is not counted as the number of pieces to store).

For example, the UE controls the number of pieces to store so as not to exceed a given value (for example, $X_2$) for the DCI utilized for the PUSCH of unicast, the DCI utilized for the PUSCH of message 3, the DCI utilized for the activation of the PUSCH of configured grant type 2, and the DCI utilized for the activation of the SP-CSI utilizing the PUSCH.

In a case that the UE receives at least one of DCI for indicating the deactivation of the PUSCH of configured grant type 2 or DCI for indicating the deactivation of the SP-CSI utilizing the PUSCH, the UE is not required to perform the transmission operation of the PUSCH (for example, preparation for the transmission of the PUSCH). Therefore, even with the structure where at least one of DCI for indicating the deactivation of the PUSCH of configured grant type 2 and DCI for indicating the deactivation of the SP-CSI utilizing the PUSCH is not counted as the number of pieces to store, the impact on the UE load can be small. By setting the structure where the DCI utilized for the deactivation is not counted as the number of pieces to store, it is possible to secure the number of pieces of other DCI to store.

<Structure 2-3>

As the DCI for the given application, DCI utilized for the scheduling of the PUSCH of unicast, and DCI utilized for the activation of the PUSCH of configured grant type 2 may be included. Meanwhile, at least one of DCI utilized for the scheduling of the PUSCH of message 3, DCI utilized for the deactivation of the PUSCH of configured grant type 2, and DCI utilized for the activation of the SP-CSI utilizing the PUSCH, and DCI utilized for the deactivation of the SP-CSI utilizing the PUSCH may be configured such that the number of pieces to store is not limited (or is not counted as the number of pieces to store).

For example, the UE controls the number of pieces to store so as not to exceed a given value (for example, $X_2$) for the DCI utilized for the PUSCH of unicast and the DCI utilized for the activation of the PUSCH of configured grant type 2.

In a case that the UE receives DCI utilized for the scheduling of the PUSCH of message 3, DCI for indicating the deactivation of the PUSCH of configured grant type 2, or DCI for indicating the activation/deactivation of the SP-CSI utilizing the PUSCH, the UE is not required to perform the transmission of unicast data other than control information of a higher layer or a physical layer. Therefore, even with the structure where at least one of these types of DCI is not counted as the number of pieces to store, the impact on the UE load can be small. By setting the structure where these types of DCI are not counted as the number of pieces to store, it is possible to secure the number of pieces of other DCI to store.

<Variations>

Note that, in the structure 2-1 to structure 2-3 described above, structures where the number of pieces to store is limited for DCI for different applications altogether are described, but the present invention is not limited to this. A structure where an upper limit of the number of pieces to store is limited for each DCI for each different application may be possible. For example, the number of pieces to store for the DCI utilized for the schedule of the PUSCH of unicast and the DCI utilized for the schedule of the PUSCH of message 3 may be set to be equal to or less than $Y_1$, and the number of pieces to store for the DCI utilized for the activation/deactivation of the PUSCH of configured grant type 2 and the DCI utilized for the activation/deactivation of the SP-CSI utilizing the PUSCH may be set to be equal to or less than $Y_2$. In this way, it is possible to flexibly control number of pieces of DCI to store depending on the applications of the DCI.

(Third Aspect)

In the third aspect, the number of pieces to store for a DCI format that is different from a DCI format utilized for the scheduling of the physical shared channel will be described.

For example, the DCI format utilized for the scheduling of the physical shared channel may be any one of DCI formats 0_0, 0_1, 1_0 and 1_1. For example, the DCI format that is different from the DCI format utilized for the scheduling of the physical shared channel may be DCI format 2 series (at least one of DCI formats 2_0, 2_1, 2_2, and 2_3).

DCI format 2_0 may be utilized for the notification of the slot format. DCI format 2_1 may be utilized for the notification of a resource block (PRB) and a symbol (OFDM symbol) in which transmission is not performed. DCI format 2_2 may be utilized for the transmission of a power control command (TPC command) of the PUCCH and PUSCH. DCI format 2_3 may be utilized for the transmission of a group TPC command for the SRS transmission.

<Option 1>

The DCI format 2 series may be configured such that the number of pieces to store in the UE is not limited (or is not counted as the number of pieces to store). In a case that the UE receives the DCI format 2 series, the UE is not required to perform the reception operation of the PDSCH or the transmission operation of the PUSCH. Therefore, even with the structure where the DCI format 2 series is not counted as the number of pieces to store, the impact on the UE load can be small to some extent.

<Option 2>

The DCI format 2 series may be configured such that the number of pieces to store in the UE is limited (or is counted as the number of pieces to store). For example, in a case that the UE receives DCI corresponding to the DCI format 2 series, the UE may count the number of pieces to store as DCI in the DL.

Figure 5:
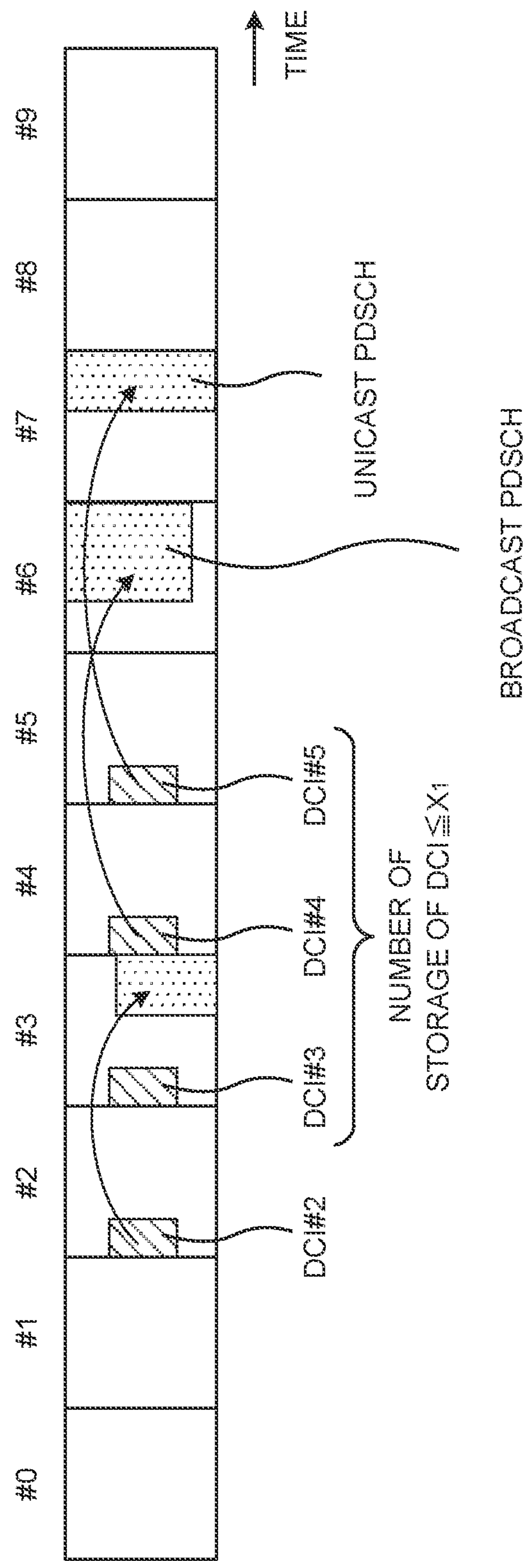
FIG. 5 is a diagram to show an example of storage control of DCI according to the third aspect.

The DCI of the DCI format 2 series may be limited in the number of pieces to store together with DCI for other applications. In a given slot (for example, the present slot at which the UE is performing the reception) of a given cell, the UE may control the number of pieces of DCI which have been received by the given slot so as not to exceed a given value (for example, $X_1$). For example, the UE may perform the reception processing assuming that number of pieces of DCI to store (for example, DCI #4, #5 of FIG. 5) for scheduling the PDSCH (at least one of unicast PDSCH and broadcast PDSCH) and DCI (for example, DCI #3 of FIG. 5) of the DCI format 2 series does not exceed a given value.

The DCI of the DCI format 2 series may be included in DCI for the given application (DCI counted as the number of pieces to store) in one of the structure 1-1 to structure 1-3 of the first aspect.

<Option 3>

The DCI format 2 series may be configured such that the number of pieces to store in the UE is limited (or is counted as the number of pieces to store). For example, in a case that the UE receives DCI corresponding to the DCI format 2 series, the UE may count the number of pieces to store as DCI in the DL.

Figure 6:
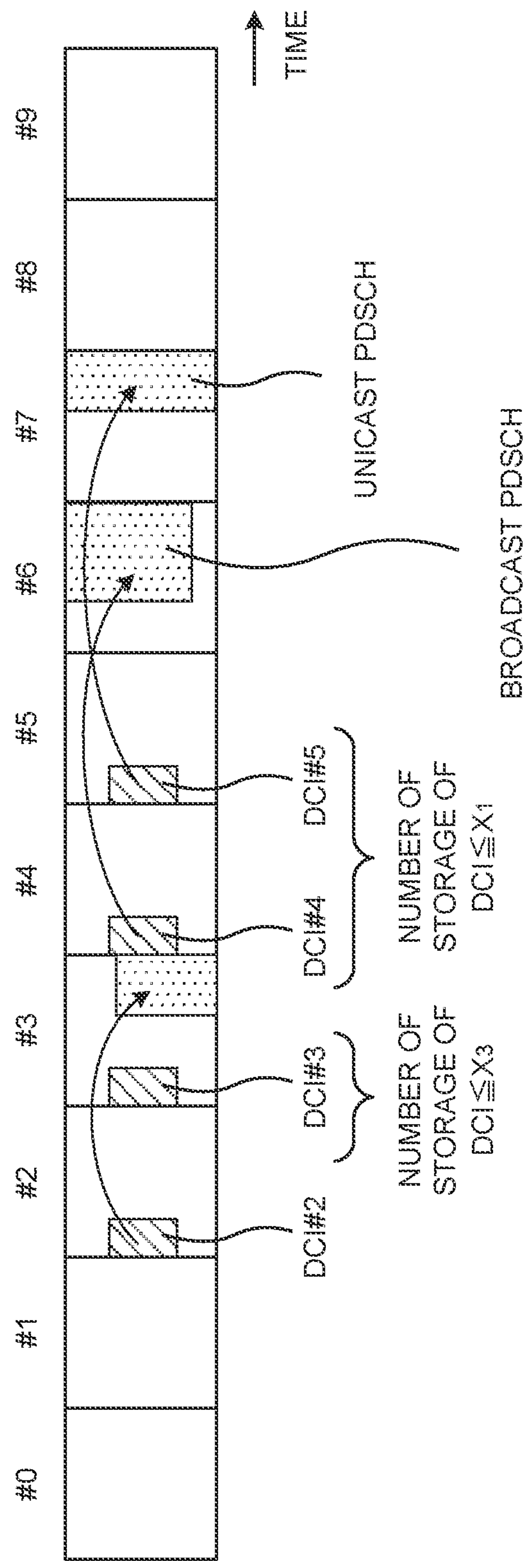
FIG. 6 is a diagram to show another example of storage control of DCI according to the third aspect.

The DCI of the DCI format 2 series may be limited in the number of pieces to store independent of DCI for other applications. For example, an upper limit (for example, $X_3$) of the number of pieces to store may be set for the DCI of the DCI format 2 series. In this case, in a given slot (for example, the present slot at which the UE is performing the reception) of a given cell, the UE may control number of pieces of DCI to store (for example, DCI #3 of FIG. 6) of the DCI format 2 series that has been received by the given slot, so as not to exceed a given value (for example, $X_3$) (see FIG. 6).

$X_3$ may be a value configured in advance by the specification, or a value configured by utilizing higher layer signaling or the like from the base station to the UE. $X_3$ may be a value same as $X_1$ indicated in the first aspect, or of $X_1$ and $X_3$ may be configured separately (for example, $X_1 >= X_3$).

In this way, by configuring number of pieces of DCI to store of the DCI format 2 series separately from DCI for applications, it is possible to flexibly configure the number of pieces to store depending on the application of DCI.

(Fourth Aspect)

In the fourth aspect, number of pieces of DCI to store for each cell in a case of performing the communication utilizing a plurality of cells (for example, applying carrier aggregation) will be described. In the following description, a cell may be interchangeably interpreted as a CC. A cell may be interchangeably interpreted as a bandwidth part (BWP) configured in the cell.

The UE may determine number of pieces of DCI to store, based on the number of cells. The cell may be the number of cells (CA application cell) configured from the base station to the UE or may be the number of the activated cells among the configured cells. The UE may control number of pieces of DCI to store so as not to exceed a given value for each cell. For the upper limit (for example, the limit number) of number of pieces of DCI to store, a different value may be configured for each cell, or the same value may be configured for each cell.

<Option 1>

The upper limit of the number of pieces of DCI of the DL or the UL to store in the UE may increase according to the number of cells (for example, linearly scale-up).

For example, a case for performing self-scheduling in each cell is assumed. In the self-scheduling, the scheduling or the like of the PDSCH or the PUSCH of a given cell is performed by DCI transmitted in the given cell. In this case, in each cell, an upper limit of number of pieces of DCI to store may be configured.

For example, an upper limit (for example, $X_1$) of number of pieces of DCI to store in each cell may be configured commonly. For the DCI to count as the number of pieces to store, any one of the first aspect to the third aspect described above may be applied.

Next, a case that cross carrier scheduling is configured is assumed. In a case that cross carrier scheduling is configured, there may be a case in which DCI for indicating the scheduling of the PDSCH in the second cell #2 is transmitted in the first cell #1. The first cell may be referred to as a cell for performing schedule or a scheduling cell, and the second cell may be referred to as a cell to be scheduled or a scheduled cell.

Figure 7:
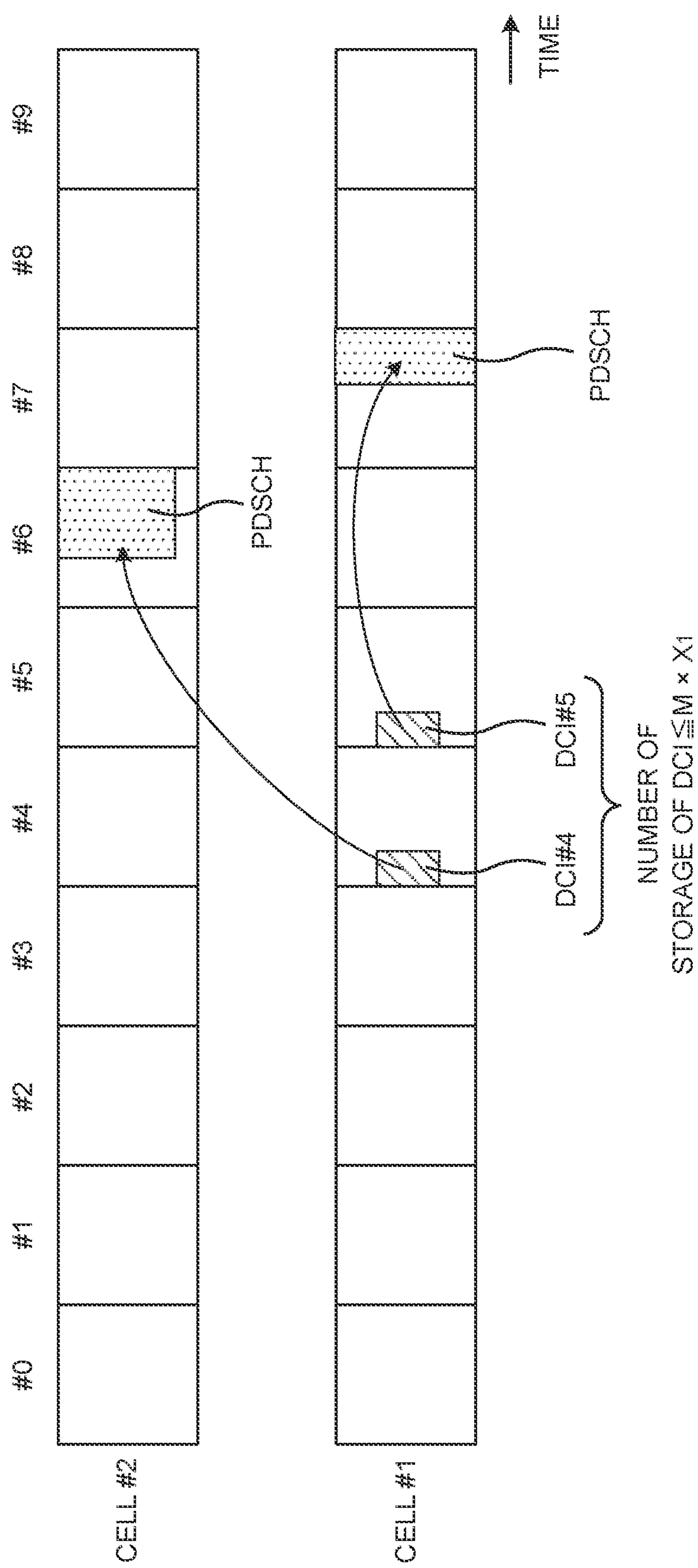
FIG. 7 is a diagram to show an example of storage control of DCI according to the fourth aspect.

In the cross carrier scheduling, an upper limit of number of pieces of DCI to store in a scheduling cell may be determined based on the number of scheduled cells where scheduling is controlled by the scheduling cell. For example, in a case that the number of cells to be scheduled by a given scheduling cell (cell #1 of FIG. 7) is M (in FIG. 7, two cells, i.e., cell #1 and cell #2), an upper limit of number of pieces of DCI to store in the scheduling cell may be determined based on M (for example, $X_1$*M).

In this case, an upper limit of number of pieces of DCI to store in the scheduled cell may be configured not to be set. Alternatively, an upper limit of number of pieces of DCI to store set by the scheduled cell may be configured to be ignored by the UE.

In this way, by configuring many upper limits of number of pieces of DCI to store in a given cell (for example, a scheduling cell), even in a case that cross carrier scheduling is configured, it is possible to appropriately control the storage of DCI.

<Option 2>

The upper limit of the number of pieces of DCI in the DL or the UL to store in the UE may be configured depending on the number of cells and UE capability.

For example, the upper limit of the number of pieces of DCI to store increases according to the number of cells in a similar manner as Option 1 until the number of configured (or activated) cells reaches a given number (for example, linearly scale-up). In a case that the number of configured cells is more than a given number (for example, four), the upper limit of number of pieces of DCI to store is determined based on UE capability. The UE capability may be a capability (for example, pdcch-BlindDetectionCA) related to blind decoding of the PDCCH in the CA.

The capability information related to blind decoding of the PDCCH in the CA is information related to the number of times of blind decoding of the PDCCH in the CA (or the number of PDCCH candidates or the number of CCEs that can be monitored by the UE), and may be reported from the UE to the base station. The UE may determine the upper limit of the number of pieces of DCI that can be stored based on the capability related to blind decoding of the PDCCH in the CA.

For example, a case for performing self-scheduling in each cell is assumed. In the self-scheduling, the scheduling or the like of the PDSCH or the PUSCH of a given cell is performed by DCI transmitted in the given cell. In this case, in each cell, an upper limit of number of pieces of DCI to store may be configured. Note that, in a case that the number of configured cells is equal to or less than a given number, Option 1 may be applied.

For example, an upper limit (for example, $X_1$*y/N) of number of pieces of DCI to store in each cell may be configured commonly. $X_1$ may be an upper limit of the number of pieces of DCI that can be stored which is configured for a cell when CA is not applied. y may be a value determined based on given UE capability (for example, pdcch-BlindDetectionCA). N may be the number of configured cells. Note that a different upper limit of the number of pieces to store may be configured for each cell. For the DCI to count as the number of pieces to store, any one of the first aspect to the third aspect described above may be applied.

Next, a case that cross carrier scheduling is configured is assumed. In the cross carrier scheduling, an upper limit of number of pieces of DCI to store in a scheduling cell may be determined based on the number of scheduled cells where scheduling is controlled by the scheduling cell.

For example, in a case that the number of cells scheduled by a given scheduling cell is M, the upper limit of number of pieces of DCI to store in the scheduling cell may be determined based on a value (y) corresponding to M and given UE capability (for example, $X_1$*M*y/N).

In this case, an upper limit of number of pieces of DCI to store in the scheduled cell may be configured not to be set. Alternatively, an upper limit of number of pieces of DCI to store set by the scheduled cell may be configured to be ignored by the UE.

In this way, by configuring many upper limits of number of pieces of DCI to store in a given cell (for example, a scheduling cell), even in a case that cross carrier scheduling is configured, it is possible to appropriately control the storage of DCI.

Note that in a case of performing CA between cells (or between BWPs) where different subcarrier spacings are configured, for the upper limit of number of pieces of DCI to store per cell, an upper limit of the number of pieces to store in one or multiple cells where each subcarrier spacing is configured may be determined by using a ratio of the number of cells where the subcarrier spacing is configured and the number of all cells where CA is configured, and the determined upper limit of the number of pieces to store may be further distributed for one or multiple cells where each subcarrier spacing is configured, to determine the upper limit of the number of pieces to store in each cell.

(Fifth Aspect)

In the fifth aspect, a case of controlling the number of pieces of DCI which can be stored by the UE depending on classification of the communication service will be described.

In NR, use cases such as further advancement of mobile broadband (enhanced Mobile Broadband (eMBB)), machine type communication for achieving multiple simultaneous connection (massive Machine Type Communications (mMTC)), high reliable and low latency communication (Ultra-Reliable and Low-Latency Communications (URLLC)), and the like are assumed. For example, in URLLC, latency reduction higher than eMBB and reliability higher than eMBB are required.

For example, difference between requirement of URLLC and requirement of eMBB may be that latency of URLLC is smaller than latency of eMBB or may be that a requirement of URLLC includes a requirement of reliability. For example, the requirement of U plane latency of eMBB may include that U plane latency of the downlink is 4 ms, and that U plane latency of the uplink is 4 ms. On the other hand, the requirement of U plane latency of URLLC may include that U plane latency of the downlink is 0.5 ms, and that U plane latency of the uplink is 0.5 ms. The requirement of the reliability of URLLC may include that an error rate of 32 bytes is $10^5$ in the U plane latency of 1 ms.

In this way, the requirements are different between URLLC and eMBB. Thus, in the fifth aspect, an operation in a case that the UE stores DCI utilized for a first communication service (for example, URLLC) and DCI utilized for a second communication service (for example, eMBB) which are different in their requirements will be described. In the following description, an example of URLLC and eMBB is described, but the applicable communication services (for example, communication services which are different in their requirements) are not limited to these.

The DCI utilized for URLLC and the DCI utilized for eMBB may be distinguished based on at least one of the configured parameter, the applied RNTI, and the condition specified by DCI (for example, tables and the like).

<DCI for URLLC>

For example, the DCI utilized for URLLC may be DCI which is CRC-scrambled by a first RNTI (for example, MCS-C-RSNT).

Alternatively, the DCI utilized for URLLC may be, for example, DCI which specifies at least one of a new Modulation and Coding Scheme (MCS) table and a new CQI (Channel Quality Indicator) table which can specify frequency utilization efficiency (Spectral efficiency) m which is less than a given value (for example, 0.2 or 0.18) or a value of R which is less than a given value (for example, 120 or 100) (here, target coding rate is Rx [1024]).

The new MCS table may be referred to as MCS table 3, a new MCS table, or qam64LowSE. MCS table 3 may be a table where a coding rate which is lower than the minimum coding rate prescribed for other MCS tables (for example, may be referred to as MCS table 1, MCS table 2) is prescribed. Alternatively, MCS table 3 may be a table where the coding rate in the same MCS index is configured to be lower in a case of comparing with MCS table 1 or MCS table 2.

Alternatively, the DCI utilized for URLLC may be DCI where a first transmission condition (or transmission parameter) is applied for at least one of the DCI and the corresponding physical shared channel. For example, in a case that the number of symbols utilized for transmission of at least one of DCI and the physical shared channel scheduled by the DCI is equal to or less than a given value, the DCI may be assumed to be DCI for URLLC.

Alternatively, the DCI utilized for URLLC may be DCI configured in a range or a transmission condition configured by higher layer signaling (for example, RRC signaling or information signals, and the like) from a base station in advance.

<DCI for eMBB>

For example, the DCI utilized for eMBB may be DCI which is CRC-scrambled by a second RNTI (for example, RNTI other than MCS-C-RNTI (for example, C-RNTI and the like)).

Alternatively, the DCI utilized for eMBB may be, for example, a table which can configure modulation by 256QAM, or DCI which specifies at least one of a Modulation and Coding Scheme (MCS) table and a CQI (Channel Quality Indicator) table which cannot specify frequency utilization efficiency (Spectral efficiency) m which is less than a given value (for example, 0.2 or 0.18) or a value of R which is less than a given value (for example, 120 or 100) (here, target coding rate is Rx [1024]).

The DCI utilized for eMBB may be, for example, a table which can configure modulation by 256QAM, and the MCS table which cannot specify frequency utilization efficiency (Spectral efficiency) m which is less than a given value (for example, 0.2 or 0.18) or a value of R which is less than a given value (for example, 120 or 100) (here, target coding rate is Rx [1024]) may be referred to as MCS table 1 or 2.

Alternatively, the DCI utilized for eMBB may be DCI where a second transmission condition (or transmission parameter) is applied for at least one of the DCI and the corresponding physical shared channel. For example, in a case that the number of symbols utilized for transmission of at least one of DCI and the physical shared channel scheduled by the DCI is greater than a given value, the DCI may be assumed to be DCI for eMBB.

Alternatively, the DCI utilized for eMBB may be DCI configured in a range or a transmission condition configured by higher layer signaling (for example, RRC signaling or information signals, and the like) from a base station in advance.

<Case of Utilizing Only URLLC>

In a case that the UE performs communication by utilizing only URLLC, an upper limit (or limit value) of the number of pieces to store in the UE may be configured for DCI for URLLC.

For example, the UE performs reception processing so that number of pieces of DCI to store for URLLC is equal to or less than a given value. The given value may be any one of 16, 32, or 64, or may be another value. The UE may report the upper limit as terminal capability information (UE capability). For classification (or an application) of DCI which the UE counts as the number of pieces to store, a combination of the structures indicated in the first aspect to the third aspect may be appropriately applied. In a case of applying CA, a combination of the structures indicated in the fourth aspect may be appropriately applied.

The network (for example, the base station) may control scheduling so as not to exceed the upper limit of number of pieces of DCI to store in the UE. In this case, the UE may perform reception processing assuming that DCI is not transmitted to exceed the upper limit of number of pieces of DCI to store.

Alternatively, DCI for URLLC may be configured not to set an upper limit (or limit value) of the number of pieces to store in UE. It is usually considered that the indication (for example, at least one of scheduling and activation/deactivation) by DCI for URLLC is specified in a range of a short term in comparison with eMBB and the like. Accordingly, even in a case that the upper limit of number of pieces of DCI to store for URLLC is not set, it is possible to suppress the increment of the processing load in the UE in comparison with other communication services.

<Case of Utilizing URLLC and eMBB>

In a case that the UE performs communication by utilizing URLLC and eMBB, an upper limit of number of pieces of DCI to store for URLLC and the upper limit of the number of pieces of DCI to store for eMBB may be set separately. In this case, the upper limit of number of pieces of DCI to store for URLLC and the upper limit of number of pieces of DCI to store for eMBB may be set separately. An upper limit may be set for the total of number of pieces of DCI to store for URLLC and number of pieces of DCI to store for eMBB.

[Option 1]

A case in which an upper limit (for example, z) of number of pieces of DCI to store for the total (for example, the total of the number of pieces to store permitted for DCI for URLLC (for example, $x_1$) and the number of pieces to store permitted for DCI for eMBB (for example, $y_1$)) of the traffic of URLLC and eMBB is set is assumed.

Figure 8:
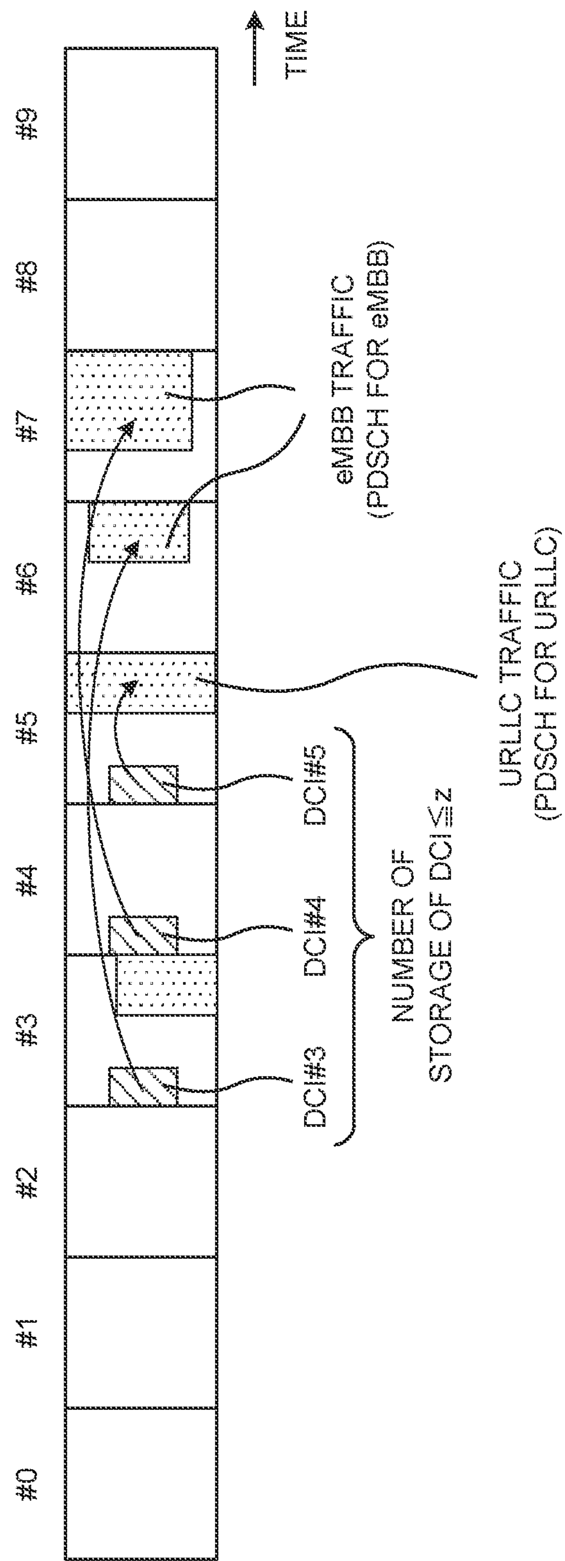
FIG. 8 is a diagram to show an example of storage control of DCI according to the fifth aspect.

The network (for example, the base station) may control scheduling so as not to exceed the upper limit of the number of pieces to store in the UE (see FIG. 8). In FIG. 8, the total of DCI #3, #4 for eMBB, and DCI #5 for URLLC accumulated in a given slot (for example, slot #5) is controlled to be equal to or less than z.

In a case of exceeding the upper limit of number of pieces of DCI to store in the UE by the scheduling (for example, DCI transmission in a given slot), the UE may control so as not to perform the reception or the transmission processing of DCI and the physical shared channel scheduled by the DCI. In other words, in a case of exceeding the upper limit of number of pieces of DCI to store, the UE may perform a skip operation for the reception processing or the transmission processing of transmitted DCI and the physical shared channel scheduled by the DCI.

Alternatively, the UE may control so as to drop or discard given DCI among pieces of DCI being stored, based on at least one of the classification of the communication service corresponding to DCI and the application of DCI.

For example, a case of exceeding the upper limit of number of pieces of DCI to store in the UE by the scheduling of URLLC traffic (for example, DCI transmission for URLLC in a given slot) is assumed. In this case, the UE may control so as not to perform a skip operation for scheduled URLLC traffic (DCI for URLLC and the physical shared channel scheduled by the DCI, and the like) but to receive and store the DCI.

Meanwhile, the UE may control so as to drop any DCI (or PDCCH) scheduled for eMBB. The DCI (or PDCCH) for eMBB to drop may be DCI for eMBB which is received temporally earliest or may be DCI for eMBB which is received temporally latest. Alternatively, the DCI (or PDCCH) for eMBB to drop may be DCI whose size (for example, transport block size (TBS)) is the biggest among the pieces of DCI for eMBB being stored.

In this way, in a case that number of pieces of DCI to store in the UE exceeds the upper limit, by preferentially performing the reception processing (for example, storage) of DCI for URLLC, it is possible to suppress latency of URLLC where low latency is required and suppress the degradation of the communication quality.

[Option 2]

For a traffic of URLLC and eMBB, an upper limit of number of pieces of DCI to store for URLLC and an upper limit of number of pieces of DCI to store for eMBB may be set in consideration of number of pieces of DCI to store of the total in the UE. In this case, an upper limit of the number of pieces of each DCI may be set so that the upper limit of number of pieces of DCI to store for URLLC and the upper limit of number of pieces of DCI to store for eMBB satisfy a given ratio.

For example, in a case of setting a given ratio for the upper limit of number of pieces of DCI to store for URLLC and the upper limit of number of pieces of DCI to store for eMBB, information related to the ratio may be notified from the base station to the UE by utilizing higher layer signaling and the like. For example, in a case that the upper limit of number of pieces of DCI to store of the total in the UE is indicated as z, the number of pieces to store permitted for DCI for URLLC (the upper limit of the number of pieces to store) is indicated as $x_1$, and the number of pieces to store permitted for DCI for eMBB is indicated as $y_1$, the number of pieces to store of each DCI may be set so that $R_{eMBB}(y_1/z)+R_{URLLC}(x_1/z)<=1$. Information related to at least one of z, $x_1$, and $y_1$ may be notified from the base station to the UE.

For example, setting of the number of pieces to store may be performed by utilizing a mechanism similar to an operation of the power control (setting mechanism of the power allocation for MCG and SCG) in the dual connectivity (DC).

The total of number of pieces of DCI to store for URLLC and DCI for eMBB set may set so as not to reach the upper limit z. In this case, the number of the rest of the storage $(1-R_{eMBB}(y_1/z)-R_{URLLC}(x_1/z))$ may be preferentially allocated to URLLC traffic (for example, DCI for URLLC). In other words, the number of the minimum storage (which may be referred to as the number of the guarantee storage) may be set for DCI for URLLC and DCI for eMBB, and allocation may be controlled in consideration of the upper limit of number of pieces of DCI to store for the part beyond the number of the guarantee storage.

Alternatively, the number of pieces to store that is permitted for each DCI may be set so that the total of the number of pieces to store $x_1$ permitted for DCI for URLLC and the number of pieces to store $y_1$ permitted for DCI for eMBB exceed the upper limit z of number of pieces of DCI to store in the UE (for example, $R_{eMBB}(y_1/z)+R_{URLLC}(x_1/z)>1$). In this case, in a case that the number of pieces of DCI to store in the UE exceeds the upper limit, DCI which has been stored may be dropped so that URLLC traffic (for example, DCI for URLLC) is given priority.

In this way, by setting the number of pieces to store $x_1$ permitted for DCI for URLLC and the number of pieces to store $y_1$ permitted for DCI for eMBB in the UE, it is possible to flexibly control the number of pieces to store of each DCI.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 9:
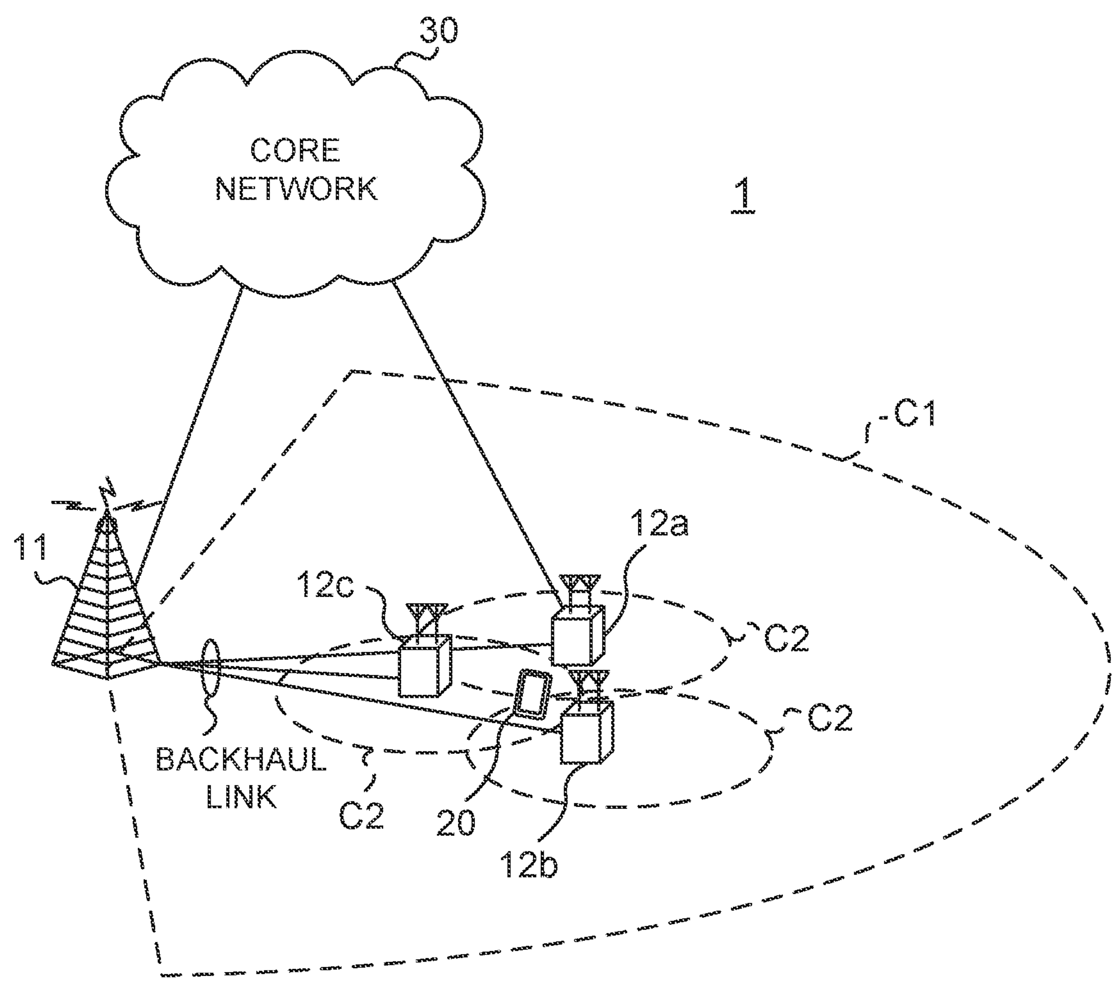
FIG. 9 is a diagram to show an example of a schematic structure of a radio communication system according to one embodiment.

FIG. 9 is a diagram to show an example of a schematic structure of the radio communication system according to one embodiment. The radio communication system 1 may be a system implementing a communication using LTE (Long Term Evolution), 5G NR (5th generation mobile communication system New Radio) and so on the specifications of which have been drafted by 3GPP (Third Generation Partnership Project).

The radio communication system 1 may support dual connectivity (multi-RAT dual connectivity (MR-DC)) between a plurality of RATs (Radio Access Technologies). The MR-DC may include dual connectivity (EN-DC (E-UTRA-NR Dual Connectivity)) between LTE (E-UTRA (Evolved Universal Terrestrial Radio Access)) and NR, dual connectivity (NE-DC (NR-E-UTRA Dual Connectivity)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NN-DC (NR-NR Dual Connectivity)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (FR1 (Frequency Range 1)) and a second frequency band (FR2 (Frequency Range 2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the CPRI (Common Public Radio Interface), the X2 interface and so on) or a wireless connection (for example, an NR communication). For example, if an NR communication is used as a backhaul between the base stations 11 and 12, the base station 11 corresponding to a higher station may be referred to as an "IAB (Integrated Access Backhaul) donor," and the base station 12 corresponding to a relay station (relay) may be referred to as an "IAB node."

The base station 10 may be connected to a core network 30 through another base station 10 or directly. For example, the core network 30 may include at least one of EPC (Evolved Packet Core), 5GCN (5G Core Network), NGC (Next Generation Core), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), CP-OFDM (Cyclic Prefix OFDM), DFT-s-OFDM (Discrete Fourier Transform Spread OFDM), OFDMA (Orthogonal Frequency Division Multiple Access), SC-FDMA (Single Carrier Frequency Division Multiple Access), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (PDSCH (Physical Downlink Shared Channel), which is used by each user terminal 20 on a shared basis, a broadcast channel (PBCH (Physical Broadcast Channel)), a downlink control channel (PDCCH (Physical Downlink Control Channel)) and so on, may be used as downlink channels.

In the radio communication system 1, an uplink shared channel (PUSCH (Physical Uplink Shared Channel), which is used by each user terminal 20 on a shared basis, an uplink control channel (PUCCH (Physical Uplink Control Channel)), a random access channel (PRACH (Physical Random Access Channel)) and so on may be used as uplink channels.

User data, higher layer control information, SIBs (System Information Blocks) and so on are communicated on the PDSCH. User data, higher layer control information and so on may be communicated on the PUSCH. The MIBs (Master Information Blocks) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One SS may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Transmission confirmation information (for example, which may be also referred to as HARQ-ACK (Hybrid Automatic Repeat reQuest), ACK/NACK, and so on) of channel state information (CSI), scheduling request (SR), and so on may be communicated by means of the PUCCH. By means of the PRACH, random access preambles for establishing connections with cells may be communicated.

Note that the downlink, the uplink, and so on in the present disclosure may be expressed without a term of "link." Various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SSB (SS Block)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 10:
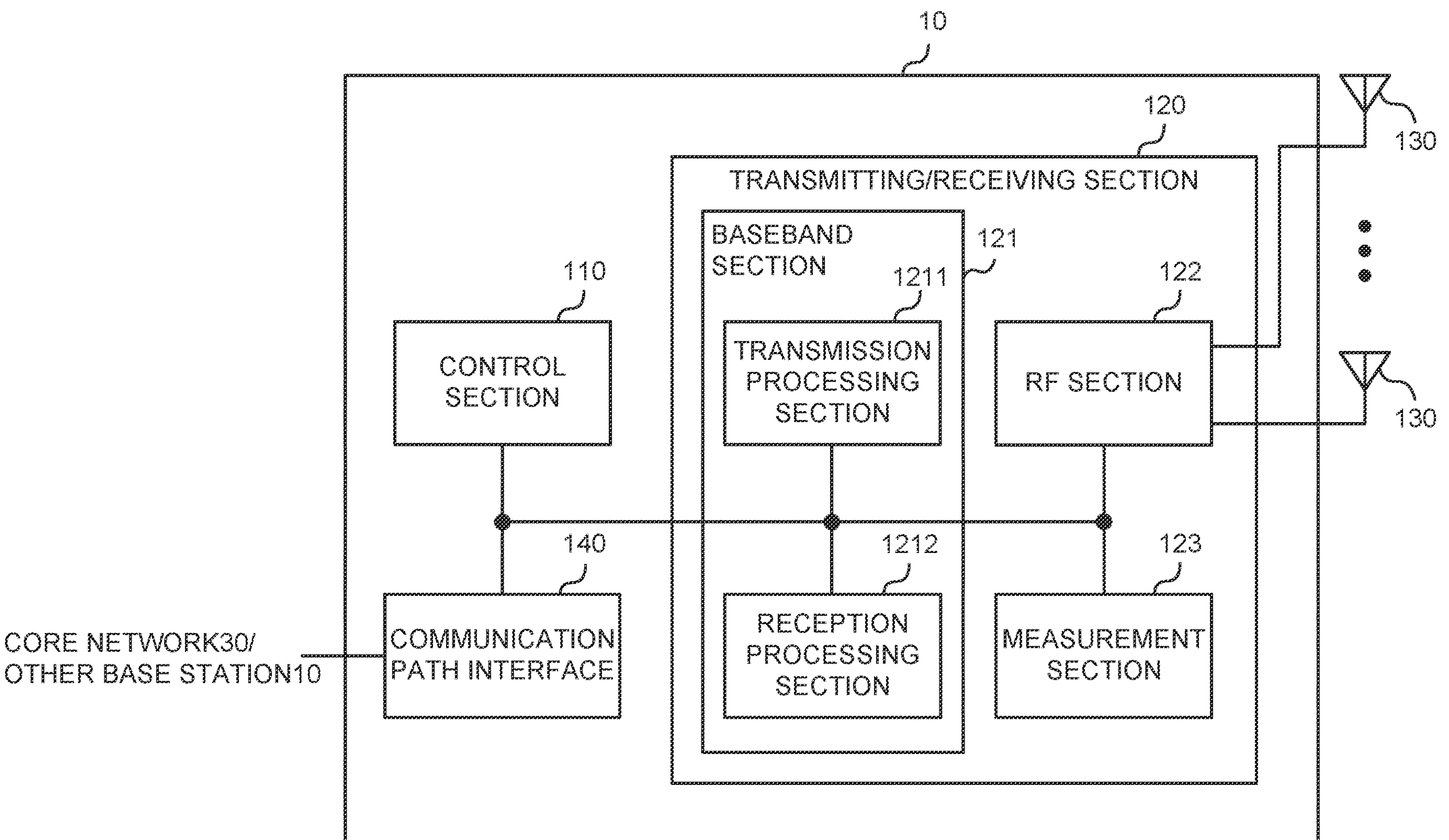
FIG. 10 is a diagram to show an example of a structure of a base station according to one embodiment.

FIG. 10 is a diagram to show an example of a structure of the base station according to one embodiment. The base station 10 includes a control section 110, a transmitting/receiving section 120, transmitting/receiving antennas 130 and a communication path interface 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, an RF (radio frequency) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the PDCP (Packet Data Convergence Protocol) layer, the processing of the RLC (Radio Link Control) layer (for example, RLC retransmission control), the processing of the MAC (Medium Access Control) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform RRM (Radio Resource Management) measurement, CSI (Channel State Information) measurement, and so on, based on the received signal. The measurement section 123 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 transmits one or more pieces of downlink control information for different applications in a given cell.

The control section 110 may control scheduling so that the number of pieces of the downlink control information stored in the UE does not exceed a given number.

The downlink control information for the given application may include downlink control information used for the scheduling of the physical shared channel, downlink control information used for the activation of the physical shared channel, and downlink control information used for the deactivation of the physical shared channel.

Alternatively, the downlink control information for the given application may include downlink control information used for the scheduling of the physical shared channel and downlink control information used for the activation of the physical shared channel. Meanwhile, the downlink control information for the given application may not include downlink control information used for the deactivation of the physical shared channel.

Alternatively, the downlink control information for the given application may include downlink control information used for the scheduling of the physical shared channel for unicast and downlink control information used for the activation of the physical shared channel. Meanwhile, the downlink control information for the given application may not include downlink control information used for the deactivation of the physical shared channel and downlink control information used for the scheduling of the physical shared channel for broadcast.

The transmitting/receiving section 120 may transmit first downlink control information and second downlink control information to which at least one of different Radio Network Temporary Identifiers (RNTIs), different modulations and coding tables, and different transmission parameters are applied.

The control section 110 may control the scheduling so that the number of pieces to store in the UE does not exceed a given number for at least one of the first downlink control information and the second downlink control information.

The upper limit of the number of pieces of first downlink control information to store and the upper limit of the number of pieces of second downlink control information to store may be set separately.

(User Terminal)

Figure 11:
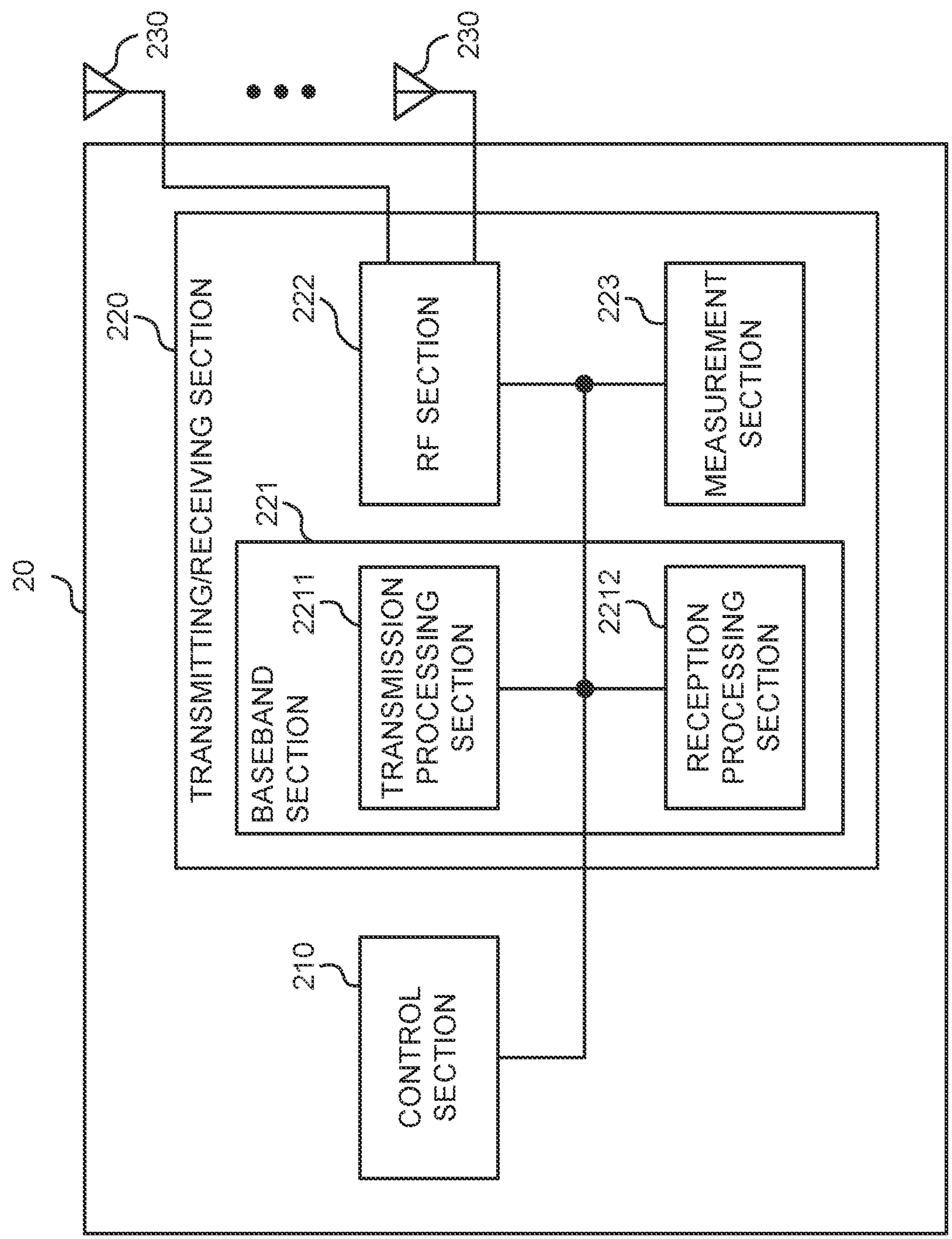
FIG. 11 is a diagram to show an example of a structure of a user terminal according to one embodiment.

FIG. 11 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 receives one or more pieces of downlink control information for different applications in a given cell.

The control section 210 may control storage so that downlink control information for a given application among the received pieces of downlink control information does not exceed a given number. Note that the storage of the DCI may be stored in a storage apparatus (for example, memory) included in the UE, and the like.

The downlink control information for the given application may include downlink control information used for the scheduling of the physical shared channel, downlink control information used for the activation of the physical shared channel, and downlink control information used for the deactivation of the physical shared channel.

Alternatively, the downlink control information for the given application may include downlink control information used for the scheduling of the physical shared channel, and downlink control information used for the activation of the physical shared channel. Meanwhile, the downlink control information for the given application may not include downlink control information used for the deactivation of the physical shared channel.

Alternatively, the downlink control information for the given application may include downlink control information used for the scheduling of the physical shared channel for unicast and downlink control information used for the activation of the physical shared channel and the deactivation of the physical shared channel. Meanwhile, the downlink control information for the given application may not include downlink control information used for the deactivation of the physical shared channel and downlink control information used for the scheduling of the physical shared channel for broadcast.

In a case of performing communication by utilizing a plurality of cells, the control section 210 may determine the number of pieces of downlink control information to store for each cell.

The transmitting/receiving section 220 may receive first downlink control information and second downlink control information to which at least one of different Radio Network Temporary Identifiers (RNTIs), different modulations and coding tables, and different transmission parameters are applied.

The control section 210 may control storage so that the first downlink control information and the second downlink control information thus received do not exceed a given number.

The upper limit of the number of pieces of first downlink control information to store and the upper limit of the number of pieces of second downlink control information to store may be set separately.

The control section 210 may control so as to preferentially drop one of the first downlink control information and the second downlink control information in a case that the number of pieces of first downlink control information to store and the number of pieces of second downlink control information to store exceed a given number.

The upper limit of the number of pieces of first downlink control information to store and the upper limit of the number of pieces of second downlink control information to store may be set in a given ratio.

The upper limit of the number of pieces of first downlink control information to store and the upper limit of the number of pieces of second downlink control information to store may be set to exceed a given number, based on a given ratio.

(Hardware Structure)

Note that the block diagrams that have been used to describe the above embodiments show blocks in functional units. These functional blocks (components) may be implemented in arbitrary combinations of at least one of hardware and software. The method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining pieces of software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 12:
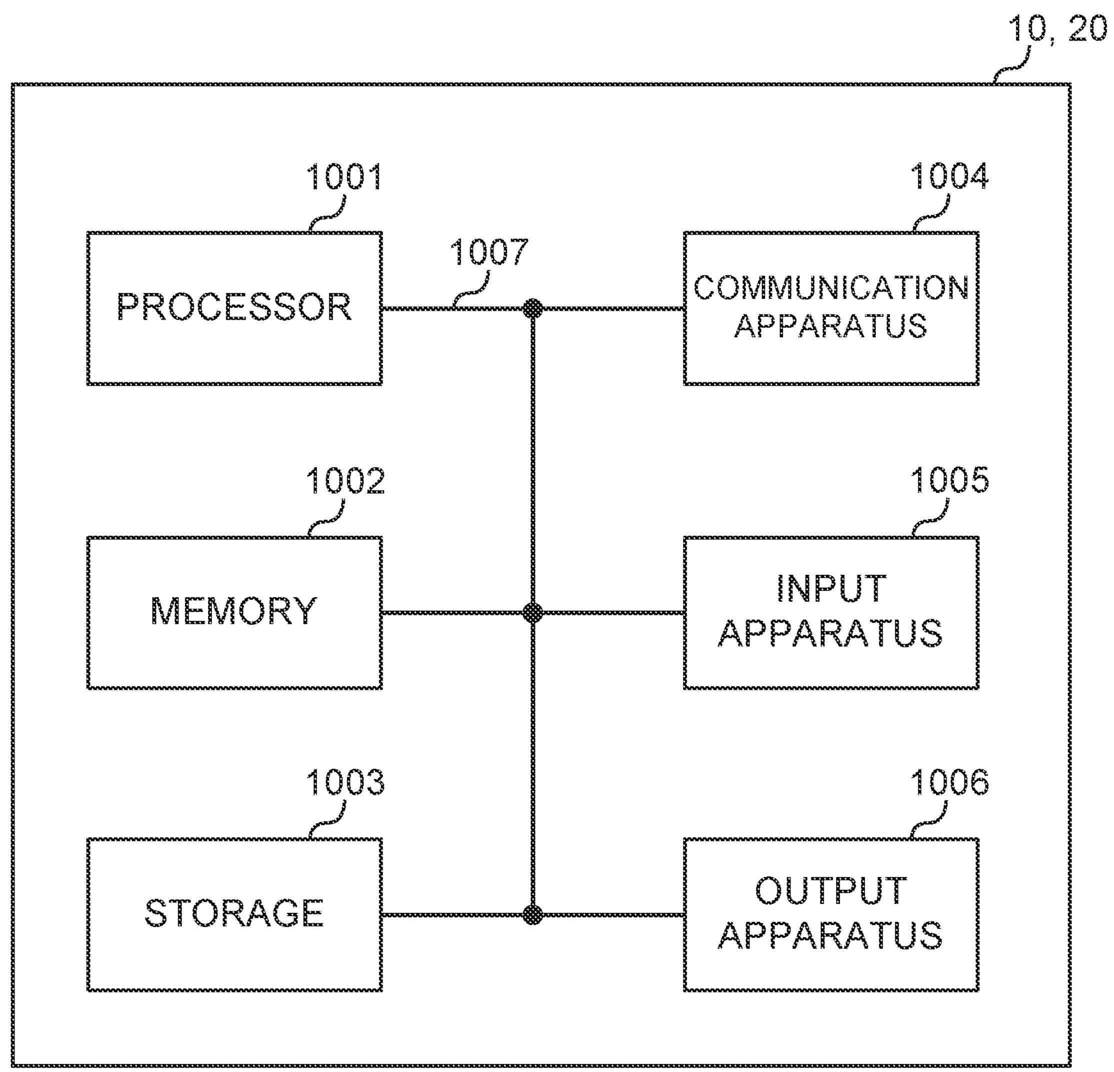
FIG. 12 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 12 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

The processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) may be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

These types of apparatus, including the processor 1001, the memory 1002, and others, are connected by a bus 1007 for communicating information. The bus 1007 may be formed with a single bus, or may be formed with buses that vary between pieces of apparatus.

The base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. "Signals" may be "messages." A reference signal may be abbreviated as an "RS," and may be referred to as a "pilot," a "pilot signal," and so on, depending on which standard applies. A "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). A slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. The number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

An RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

A resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

The information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals or combinations of these.

Note that physical layer signaling may be referred to as "L1/L2 (Layer 1/Layer 2) control information (L1/L2 control signals)," "L1 control information (L1 control signal)," and so on. RRC signaling may be referred to as an "RRC message," and can be, for example, an RRC connection setup message, an RRC connection reconfiguration message, and so on. MAC signaling may be reported using, for example, MAC control elements (MAC CEs).

Reporting of given information (for example, reporting of "X holds") does not necessarily have to be reported explicitly, and may be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "TCI state (Transmission Configuration Indication state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into a plurality of smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

The base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

"Judging (determining)" may be interpreted to mean making "judgments (determinations)" about receiving (for example, receiving information), transmitting (for example, transmitting information), input, output, accessing (for example, accessing data in a memory), and so on.

"Judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

"Judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:

a transmitter that transmits a first physical uplink shared channel which is scheduled for a first cell and that transmits a second physical uplink shared channel which is scheduled for a second cell respectively; and a processor that controls a reception process by assuming that up to a maximum number X of physical downlink control channels for downlink control information, the downlink control information being with cyclic redundancy check (CRC) scrambled by a given radio network temporary identifier (RNTI), for all of the maximum number X of physical downlink control channels, are received, the downlink control information scheduling a physical uplink shared channel that has not been transmitted and is different from the first and second physical uplink shared channel, wherein the maximum number X of physical downlink control channels is more than one, and wherein the processor assumes that up to the maximum number X of physical downlink control channels are respectively received per cell including the first cell and the second cell.

2. The terminal according to claim 1, wherein the processor performs a control to not include, in the maximum number X of physical downlink control channels, reception of a physical downlink control channel for a downlink control information with CRC scrambled by a temporary cell RNTI (TC-RNTI).

3. The terminal according to claim 2, wherein the downlink control information comprises a DCI format 0_0 or a DCI format 0_1.

4. The terminal according to claim 2, wherein, when cross-carrier scheduling is applied, the processor determines a maximum number of receptions of physical downlink control channels in scheduled cells based on a number of the scheduled cells.

5. The terminal according to claim 2, wherein the maximum number X of physical downlink control channels is 16.

6. The terminal according to claim 1, wherein the downlink control information comprises a DCI format 0_0 or a DCI format 0_1.

7. The terminal according to claim 6, wherein, when cross-carrier scheduling is applied, the processor determines a maximum number of receptions of physical downlink control channels in scheduled cells based on a number of the scheduled cells.

8. The terminal according to claim 1, wherein, when cross-carrier scheduling is applied, the processor determines a maximum number of receptions of physical downlink control channels in scheduled cells based on a number of the scheduled cells.

9. The terminal according to claim 1, wherein the maximum number X of physical downlink control channels is 16.

10. The terminal according to claim 1, wherein the given RNTI comprises a cell RNTI (C-RNTI), a configured scheduling RNTI (CS-RNTI), or a modulation and coding scheme cell RNTI (MCS-C-RNTI).

11. A radio communication method for a terminal, comprising:

transmitting a first physical uplink shared channel which is scheduled for a first cell and transmitting a second physical uplink shared channel which is scheduled for a second cell respectively; and controlling a reception process by assuming that up to a maximum number X of physical downlink control channels for downlink control information, the downlink control information being with cyclic redundancy check (CRC) scrambled by a given radio network temporary identifier (RNTI), for all of the maximum number X of physical downlink control channels, are received, the downlink control information scheduling a physical uplink shared channel that has not been transmitted and is different from the first and second physical uplink shared channel, wherein the maximum number X of physical downlink control channels is more than one, and wherein the radio communication method further comprises controlling a reception process by assuming that up to the maximum number X of physical downlink control channels are respectively received per cell including the first cell and the second cell.

12. A base station comprising:

a receiver that receives a first physical uplink shared channel which is scheduled for a first cell and that receives a second physical uplink shared channel which is scheduled for a second cell respectively; and a processor that controls a transmission process by assuming that a terminal receives up to a maximum number X of physical downlink control channels for downlink control information, the downlink control information being with cyclic redundancy check (CRC) scrambled by a given radio network temporary identifier (RNTI), for all of the maximum number X of physical downlink control channels, the downlink control information scheduling a physical uplink shared channel that has not been transmitted by the terminal and is different from the first and second physical uplink shared channel, wherein the maximum number X of physical downlink control channels is more than one, and wherein the processor assumes that up to the maximum number X of physical downlink control channels are respectively received by the terminal per cell including the first cell and the second cell.

13. A system comprising a terminal and a base station, wherein:

the terminal comprises:

a transmitter that transmits a first physical uplink shared channel which is scheduled for a first cell and that transmits a second physical uplink shared channel which is scheduled for a second cell respectively; and a first processor that controls a reception process by assuming that up to a maximum number X of physical downlink control channels for downlink control information, the downlink control information being with cyclic redundancy check (CRC) scrambled by a given radio network temporary identifier (RNTI), for all of the maximum number X of physical downlink control channels, are received, the downlink control information scheduling a physical uplink shared channel that has not been transmitted and is different from the first and second physical uplink shared channel, wherein the maximum number X of physical downlink control channels is more than one, and wherein the first processor assumes that up to the maximum number X of physical downlink control channels are respectively received per cell including the first cell and the second cell, and the base station comprises:

a receiver that receives the first and second physical uplink shared channel respectively; and a second processor that controls a transmission process by assuming that the terminal receives up to the maximum number X of the physical downlink control channels, wherein the second processor assumes that up to the maximum number X of physical downlink control channels are respectively received by the terminal per cell including the first cell and the second cell.

* * * * *